United States Patent
Denneau et al.

(10) Patent No.: US 7,477,608 B2
(45) Date of Patent: Jan. 13, 2009

(54) METHODS FOR ROUTING PACKETS ON A LINEAR ARRAY OF PROCESSORS

(75) Inventors: Monty M. Denneau, Brewster, NY (US); Peter H. Hochschild, New York, NY (US); Richard A. Swetz, Mahopac, NY (US); Henry S. Warren, Jr., Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 11/186,693

(22) Filed: Jul. 21, 2005

(65) Prior Publication Data

US 2005/0254492 A1      Nov. 17, 2005

Related U.S. Application Data

(62) Division of application No. 09/525,707, filed on Mar. 14, 2000, now Pat. No. 6,961,782.

(51) Int. Cl.
*H04L 12/26* (2006.01)
*H04L 12/66* (2006.01)
*G06F 15/00* (2006.01)

(52) U.S. Cl. ............... 370/241; 370/353; 370/380; 370/400; 712/11

(58) Field of Classification Search ............. 370/351, 370/380, 400–409, 254, 241, 353, 354, 248–252, 370/255, 361; 709/238–242, 250–253
See application file for complete search history.

(56) References Cited

U.S. PATENT DOCUMENTS 5,048,087 A * 9/1991 Trbovich et al. .......... 380/43
6,961,782 B1 * 11/2005 Denneau et al. .......... 709/241

\* cited by examiner

*Primary Examiner*—Afsar M. Qureshi
(74) *Attorney, Agent, or Firm*—F. Chau & Associates, LLC (57) ABSTRACT

There is provided a method for routing packets on a linear of N processors connected in a nearest neighbor configuration. The method includes the step of, for each end processor of the array, connecting unused outputs to corresponding unused inputs. For each axis required to directly route a packet from a source to a destination processor, the following steps are performed. It is determined whether a result of directly sending a packet from an initial processor to a target processor is less than or greater than N/2 moves, respectively. The initial processor is the source processor in the first axis, and the target processor is the destination processor in the last axis. The packet is directly sent from the initial processor to the target processor, when the result is less than N/2 moves. The packet is indirectly sent so as to wrap around each end processor, when the result is greater than N/2 moves. The method may optionally include the step of randomly sending the packet using either of the sending steps, when the result is equal to N/2 moves and N is an even number.

12 Claims, 6 Drawing Sheets

METHODS FOR ROUTING PACKETS ON A LINEAR ARRAY OF PROCESSORS

CROSS-REFERENCE TO RELATED APPLICATION

This application is a Divisional of U.S. application Ser. No. 09/525,707 filed on Mar. 14, 2000 now U.S. Pat. No. 6,961,782, which is incorporated herein by reference.

BACKGROUND

1. Technical Field

The present invention generally relates to processing systems and, in particular, to methods for routing packets on a linear array of processors with nearest neighbor interconnection.

2. Background Description

Figure 1:
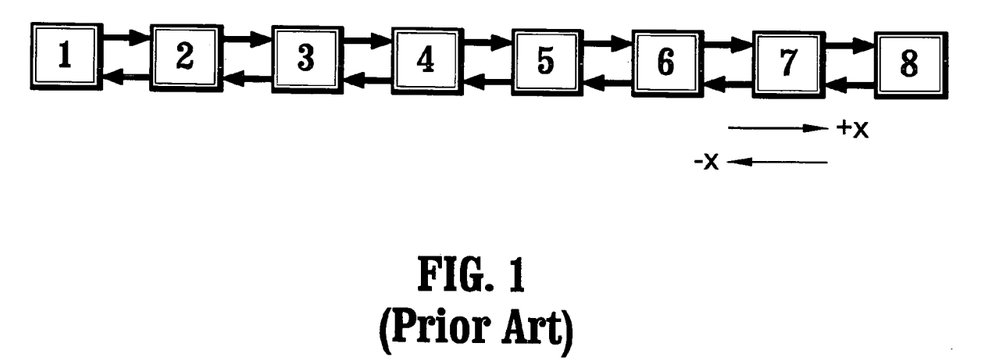
FIG. 1 is a diagram illustrating an elementary connection scheme for an array of eight processors according to the prior art.

As used herein, the term "ruler" refers to an in-line arrangement of processing elements, wherein each processing element of the arrangement is connected to its nearest neighbor, if any. The phrase "processing element" is hereinafter interchangeably referred to as "a node" or "a processor". FIG. 1 is a diagram illustrating an elementary connection scheme (hereinafter referred to as a "direct" connection scheme or method) for an array of eight processors according to the prior art. Packets are injected by senders into left or right moving slots that advance one node per clock cycle. Packets are removed by receivers, freeing the slots. Packets on the top of the ruler move right (in the positive x direction) and packets on the bottom of the ruler move left (in the negative x direction). The links (inputs and outputs) to the left of node 1 and to the right of node 8 are not connected (and are thus not shown).

The nodes may be arranged in a two-dimensional array wherein communication between processors in different rows of the array is achieved by traveling first along horizontal rulers and then along vertical rulers. Each row has a corresponding horizontal ruler and each column has a corresponding vertical ruler. For example, in an exemplary 8 by 8 array of nodes, a packet sent from location (3,4) to location (6,7) enters the array at node (3,4), travels (4,4)->(5,4)->(6,4) along the horizontal ruler in row 4, hops to the column 6 vertical ruler at node (6,4), and travels (6,4)->(6,5)->(6,6)->(6,7) along the vertical ruler, terminating at location (6,7).

When chips and boards are combined into machines with up to tens of thousands of processor chips, a straightforward generalization of this scheme to three dimensions routes packets first along "x" rulers, then "y" rulers, and finally along "z" rulers. Because of the short distances and constant regeneration by clocking, rulers achieve extremely high communication bandwidth.

Unfortunately, what would seem to be the obvious method for routing packets on a ruler has a serious drawback. The drawback is unfairness, i.e., disparate bandwidth between the nodes of the ruler. In particular, nodes near the outside of the ruler get significantly more bandwidth than nodes near the center of the ruler. This is illustrated in the following example. Suppose that in a ruler with 8 nodes, packets are sent directly from source to destination. To get from node 2 to node 7, a packet travels 2->3->4->5->6->7. Since nodes 1 and 8 are never blocked by packets passing through, they get to inject traffic on every cycle. To a lesser extent, the same is true of nodes 2 and 7. In contrast, nodes 4 and 5, being near the center, are blocked a large fraction of the time.

If a large number of long wires were available, then this problem could be circumvented by a central arbitration scheme. However, the primary virtue of a ruler is that no wire travels more than one element, so that clock rates can be extremely high. In addition, the number of wires required for request/reply arbitration can potentially be as high as the number of wires used for data.

Thus, it would be desirable and highly advantageous to have methods for routing packets on a linear array of processors that provide fairness (no sender is preferred) with respect to all the processors of the array, without reducing bandwidth. Moreover, it would be desirable and highly advantageous to have methods for routing packets on a linear array of processors with reduced latency and power consumption with respect to the prior art.

SUMMARY OF THE INVENTION

The problems stated above, as well as other related problems of the prior art, are solved by the present invention, methods for routing packets on a linear array of processors (a ruler).

Contrary to the prior art approach of sending packets directly from one node to another, the present invention sends some packets in the "wrong" direction, wrapping around one end of the ruler, traveling the full length, wrapping around the other end, and finally arriving at the destination, in the case of a one-dimensional array. Advantageously, the result is that complete fairness is achieved with no reduction in bandwidth. The present invention also applies to multi-dimensional processor arrays. Moreover, the present invention provides methods for routing packets on a ruler with reduced power consumption and latency.

According to a first aspect of the invention, there is provided a method for routing packets on a linear array of N processors connected in a nearest neighbor configuration. The method includes the step of, for each end processor of the array, connecting unused outputs to corresponding unused inputs. For each axis required to directly route a packet from a source to a destination processor, the following steps are performed. It is determined whether a result of directly sending a packet from an initial processor to a target processor is less than or greater than N/2 moves, respectively. The initial processor is the source processor in the first axis, and the target processor is the destination processor in the last axis. The packet is directly sent from the initial processor to the target processor, when the result is less than N/2 moves. The packet is indirectly sent so as to wrap around each end processor, when the result is greater than N/2 moves.

According to a second aspect of the invention, the method further includes the step of randomly sending the packet using either of the sending steps, when the result is equal to N/2 moves and N is an even number.

According to a third aspect of the invention, the indirectly sending step includes the step of initially sending the packet in an opposing direction with respect to the target processor, wrapping around a first end processor, proceeding to and wrapping around a second end processor, and proceeding to the target processor.

According to a fourth aspect of the invention, the method includes the step of the target processor receiving the packet upon a second pass thereby, when the packet is sent indirectly.

According to a fifth aspect of the invention, the method further includes the step of adding a 0-bit or a 1-bit to the packet, depending on whether the packet is to be injected into a corresponding axis in the positive or the negative direction, respectively.

According to a sixth aspect of the invention, the packet can only be removed when traveling in the positive direction, if the 0-bit is added thereto.

According to a seventh aspect of the invention, the packet can only be removed when traveling in the negative direction, if the 1-bit is added thereto.

According to an eighth aspect of the invention, the method further includes the step of placing the packet in a first queue or a second queue, depending on whether the 0-bit or the 1-bit is added to the packet, respectively.

According to a ninth aspect of the invention, there is provided a method for routing packets on a linear array of N processors connected in a nearest neighbor configuration. The method includes the step of, for each end processor of the array, connecting unused outputs to corresponding unused inputs. For each axis required to directly route a packet from a source to a destination processor, the following steps are performed. It is determined whether a result of directly sending a packet from an initial processor to a target processor is greater than N/2 moves. The initial processor is the source processor in a first axis. The target processor is the destination processor in a last axis. The packet is directly sent from the initial processor to the target processor, irrespective of the result. At least one of a first dummy packet and a second dummy packet are indirectly sent so as to wrap around each end processor, when the result is greater than N/2 moves. The first dummy packet is indirectly sent from and to the initial processor. The second dummy packet is indirectly sent from and to the target processor.

According to a tenth aspect of the invention, the first dummy message is indirectly sent in an initially opposing direction with respect to the target processor.

According to an eleventh aspect of the invention, the second dummy packet is indirectly in an initially same direction as the data packet.

According to a twelfth aspect of the invention, the method further includes the step of adding a dummy field to the data packet that indicates to the target processor that the second dummy packet is to be created upon receipt of the data packet, when the result is greater than N/2 moves.

According to a thirteenth aspect of the invention, the method further includes the step of storing the last packet that passed through the initial processor or originated from the initial processor. The first dummy packet is created from the last packet, to reduce energy consumption resulting from voltage and/or current switching.

According to a fourteenth aspect of the invention, the method further includes the step of storing the last packet that passed through the target processor or originated from the target processor. The second dummy packet is created from the last packet, to reduce energy consumption resulting from voltage and/or current switching.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to methods for routing packets on a linear array of processors. In contrast to the prior art, the methods of the present invention provide fairness with respect to all the processors of the array. That is, no processor has preferential treatment in its use of the interconnection path. Moreover, the methods of the present invention provide such fairness without reducing bandwidth. The result is achieved by directing some of the traffic the "wrong" way, i.e., a route that seems longer than necessary.

To facilitate a clear understanding of the present invention, definitions of terms employed herein will now be given. Initially, the following terms and/or phrases are used interchangeably herein: "processing element", "node" and "processor"; "hop" and "move"; "axis" and "dimension"; and "message" and "packet". The term "ruler" refers to an in-line arrangement of processors, wherein each processor of the arrangement is connected to its nearest neighbor, if any. The designation N refers to the number of processors on a particular ruler. The particular ruler may be one of many comprised in an array of processors. The terms "hop" and "move" refer to the movement of a packet from a given processor to one of its nearest neighbors, and may be expressed in terms of N. It is to be noted that the present invention is particularly suited for arrays in which data moves one processor per clock cycle. However, the present invention may be just as readily used in systems in which data moves one processor per more than one clock cycle.

It is to be understood that the present invention may be implemented in various forms of hardware, software, firmware, special purpose processors, or a combination thereof. The present invention is preferably implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and micro-instruction code. The various processes and functions described herein may either be part of the basic hardware, the micro-instruction code or the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Moreover, because some of the constituent system components and method steps depicted in the accompanying Figures may be implemented in both hardware and software, items bearing the same reference numeral may be referred to in manner indicative of both hardware and software. Given the teachings of the invention provided herein, one of ordinary skill in the related art will be able to contemplate these and similar implementations or configurations of the present invention.

Figure 2:
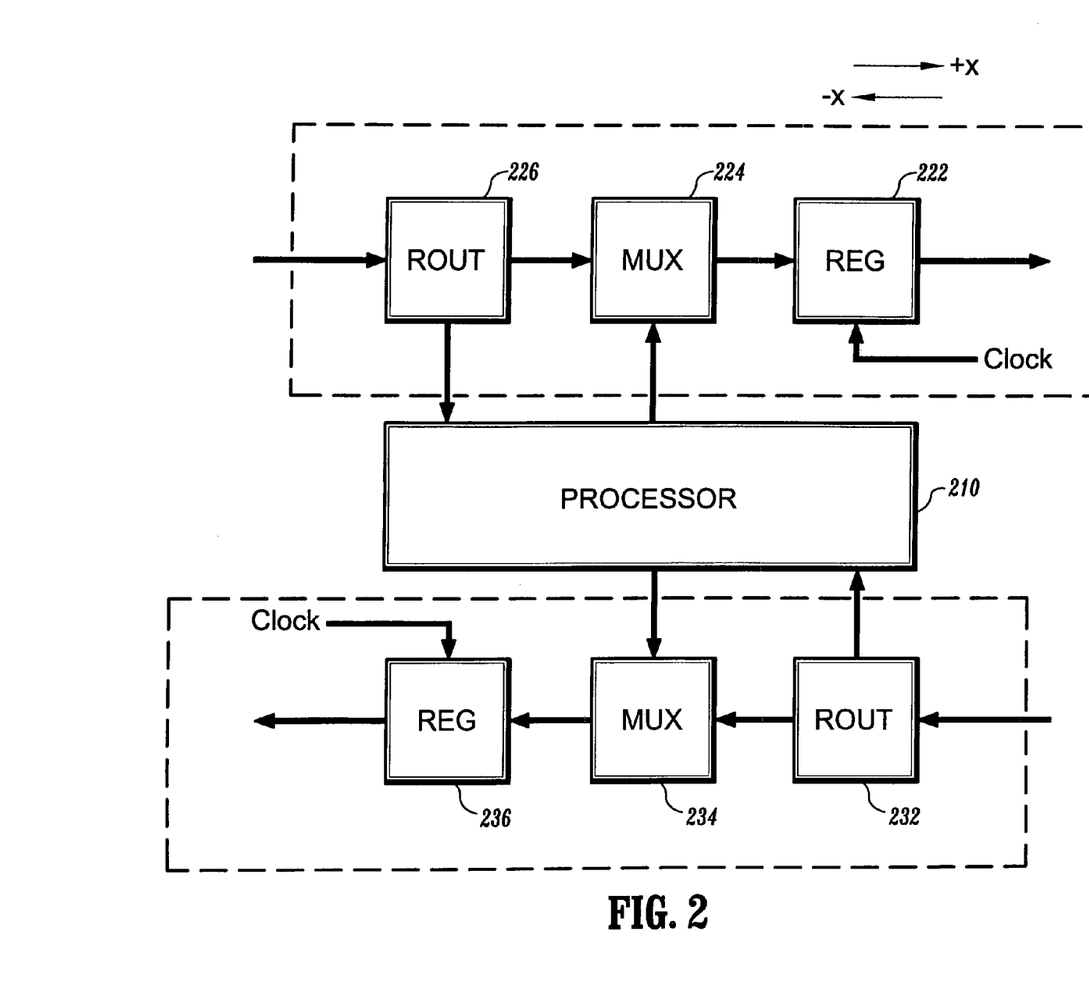
FIG. 2 is a diagram illustrating the connection logic associated with a single processor in a multiprocessor array to which the present invention is applied.

FIG. 2 is a diagram illustrating the connection logic associated with a single processor 210 in a multiprocessor array to which the present invention may be applied. The following description will be given with respect to the positive x direction connection logic 220 (226, 224, 222) located above the processor in FIG. 2, which passes packets in the positive x direction (i.e., to the right). The negative x direction connection logic 230 (236, 234, and 232) located below the processor in FIG. 2 operates in a similar fashion as connection logic 220, except that logic 230 passes packets in the negative x direction (i.e., to the left). Due to the similarity of operation of connection logic 220 and connection logic 230, a description of the latter is omitted for the sake of brevity.

According to an illustrative embodiment of the present invention, the connection logic 220 of processor 210 for routing packets in the positive x direction on a corresponding ruler includes a register (REG 222) preceded by a multiplexer (MUX 224) and some elementary routing control (ROUT 226). If an incoming packet is not intended for processor 210, then the packet passes through ROUT 226 to MUX 224 to REG 222, is re-clocked, and proceeds to the next node on the next cycle. If the packet is intended for processor 210, then the packet is copied off the ruler before MUX 224 (by ROUT 226), and the slot is now free. Thus, a slot can be free either because the slot arrived empty, or because the packet the slot was carrying was removed. A sending node is allowed to insert a new packet on any empty slot by loading the register through the multiplexer.

Duplicate elements as those shown in FIG. 2 (226, 224, 222, 236, 234, 232) may be used for additional axes (y and/or z) of the array. Thus, presuming that the elements shown in FIG. 2 correspond to an x-axis of an array, then those same elements (i.e., 2 of each element, corresponding to the positive and negative directions of a given axis) may be duplicated for use for each additional axis (y and/or z) of the array.

Alternatively, the elements shown in FIG. 2 may include additional inputs and outputs to deal with additional axes, so that duplicative elements are not required for each processor in an array having multiple (2 or more) axes. Moreover, the functions of these three elements may be combined so that only one element of each type (222, 224, 226) can deal with each direction (positive and negative) of each axis. Further, the functions of these three elements may be combined into one or more elements for each processor (irrespective of the number of axes).

In sum, it is to be appreciated that the present invention is not dependent on any particular connection topology, except that the processors be connected in a nearest neighbor configuration (i.e., each processor is connected to its nearest neighboring processor in each direction of each axis of the array). Given the teachings of the present invention provided herein, one of ordinary skill in the related art will contemplate these and similar implementations of the elements of the present invention.

A description of the "wrong" way routing scheme of the present invention will now be given with respect to FIG. 3.

Figure 3:
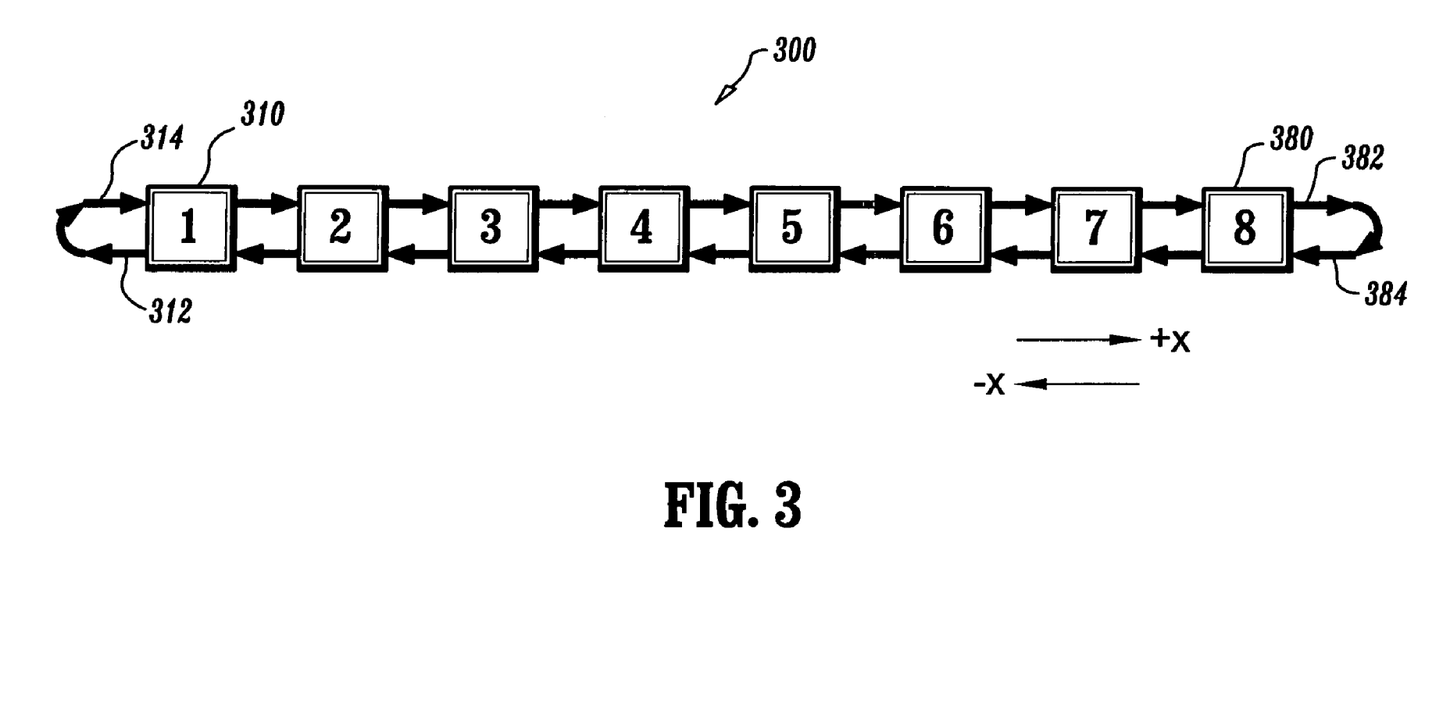
FIG. 3 is a diagram illustrating the connection of a 1-dimensional array of processors according to an illustrative embodiment of the present invention.

FIG. 3 is a diagram illustrating the connection of a 1-dimensional array 300 of eight processors according to an illustrative embodiment of the present invention.

The array 300 includes two end processors, a left end processor 310 and a right end processor 380. The left end processor 310 includes an unused left output 312 (for outputting packets in the negative x direction) and an unused left input 314 (for inputting packets in the positive x direction). The right end processor 380 includes an unused right output 382 (for outputting packets in the positive x direction) and an unused right input 384 (for inputting packets in the negative x direction).

According to the present invention, the unused left output 312 and unused left input 314 of the left end processor 310 are interconnected (wrapped). Similarly, the unused right output 382 and unused right input 384 of the right end processor 380 are interconnected. Thus, in the former case, packets sent in the negative x direction (i.e., to the left) by left end processor 310 wrap around so as to then travel in the positive x direction (i.e., to the right). In the latter case, packets sent in the positive x direction (i.e., to the right) by right end processor 380 wrap around so as to then travel in the negative x direction (i.e., to the left).

It is to be appreciated that the methods of the present invention involve routing a data packet in a processor array. According to the invention, the routing of a packet (either directly or indirectly) involves one processor sending the packet and one processor receiving the packet, for each dimension the packet must traverse. Each sending processor is referred to as an "initial processor" and each receiving processor is referred to as a "target processor". However, the initial processor that actually originated the packet (the first sending processor) is also referred to as the "source processor" and the target processor that ultimately receives the packet (the last receiving processor) is also referred to as the "destination processor". Stated another way, the initial processor (sending processor) of the first axis to be traversed is also known as the source processor and the target processor (receiving processor) of the last axis to be traversed is also known as the destination processor.

Thus, if a packet is to traverse all three axes of a 3-dimensional array in the order x, y, and z, each of the axes x, y, and z will have an initial and a target processor. However, the initial processor in the x axis (the first axis to be traversed) is actually the source processor, and the target processor in the z axis (the last axis to be traversed) is actually the destination processor.

According to the present invention, packets are routed in an array based on predefined criteria (hereinafter "criteria"), which are applied one dimension at a time. The criteria are as follows. If sending the packet from an initial processor to a target processor using the direct method (i.e., in the direct direction) would result in less than N/2 hops, then the packet is sent that way. If sending the packet from the initial processor to the target processor using the direct method would result in more than N/2 hops, then the packet is sent the "wrong" way, as described more fully hereinbelow. If sending the packet from the initial processor to the target processor using the direct method would result in exactly N/2 hops, where N is an even number, then the packet is sent in a direction (i.e., either direct or "wrong") chosen at random.

According to a preferred embodiment of the present invention, a single bit of either 0 or 1 is added to each packet, depending on whether the initial processor (sending processor) injects the packet into the positive direction or the negative direction (respectively). If the bit is 0, then the packet can only be inserted and removed by the connection logic for the positive direction. If the bit is 1, then the packet can only be inserted and removed by the connection logic for the negative direction. The 0-bit and the 1-bit provide, among other things, a quick indication to a processor of whether that processor should simply ignore the packet (since, for example, the processor has just received the packet through the positive connection logic and the added bit is set to 0). Thus, for the example of FIG. 3, if the bit is 0, then the packet can only be inserted and removed by the connection logic for the positive x direction (i.e., from the top of the ruler). If the bit is 1, then the packet can only be inserted and removed by the connection logic for the negative x direction (from the bottom of the ruler).

According to an optimization of the above preferred embodiment of the present invention, packets having a 0-bit inserted therein are placed in a first queue and packets having a 1-bit inserted therein are placed in a second queue. The first and second queues may be incorporated into the connection topologies of the individual processors so as to assign an order (e.g., first in, first out (FIFO)) to the sending of packets in each direction of each axis.

Figure 4:
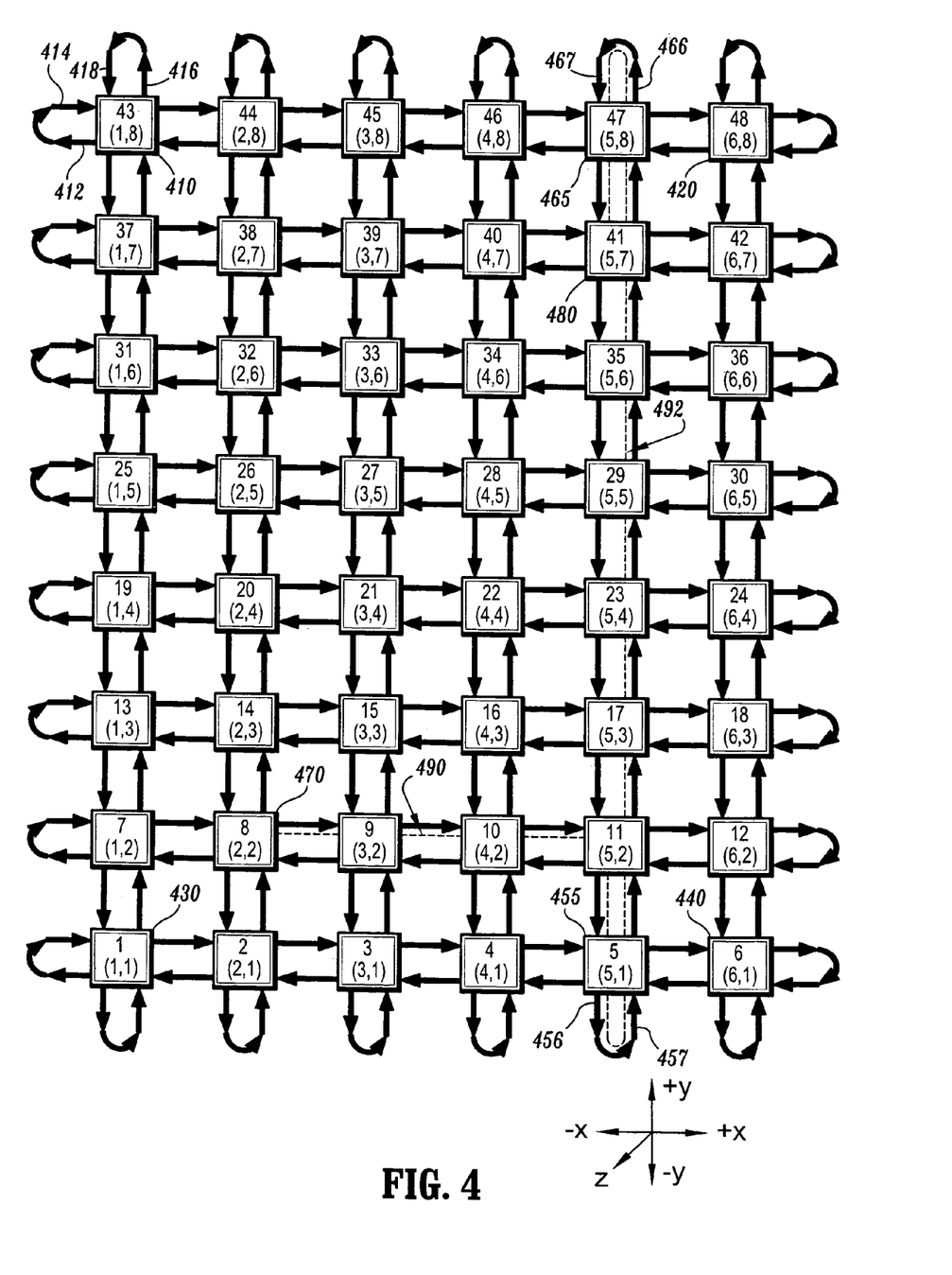
FIG. 4 is a diagram illustrating the connection of a 2-dimensional array of processors according to an illustrative embodiment of the present invention.
Figure 5:
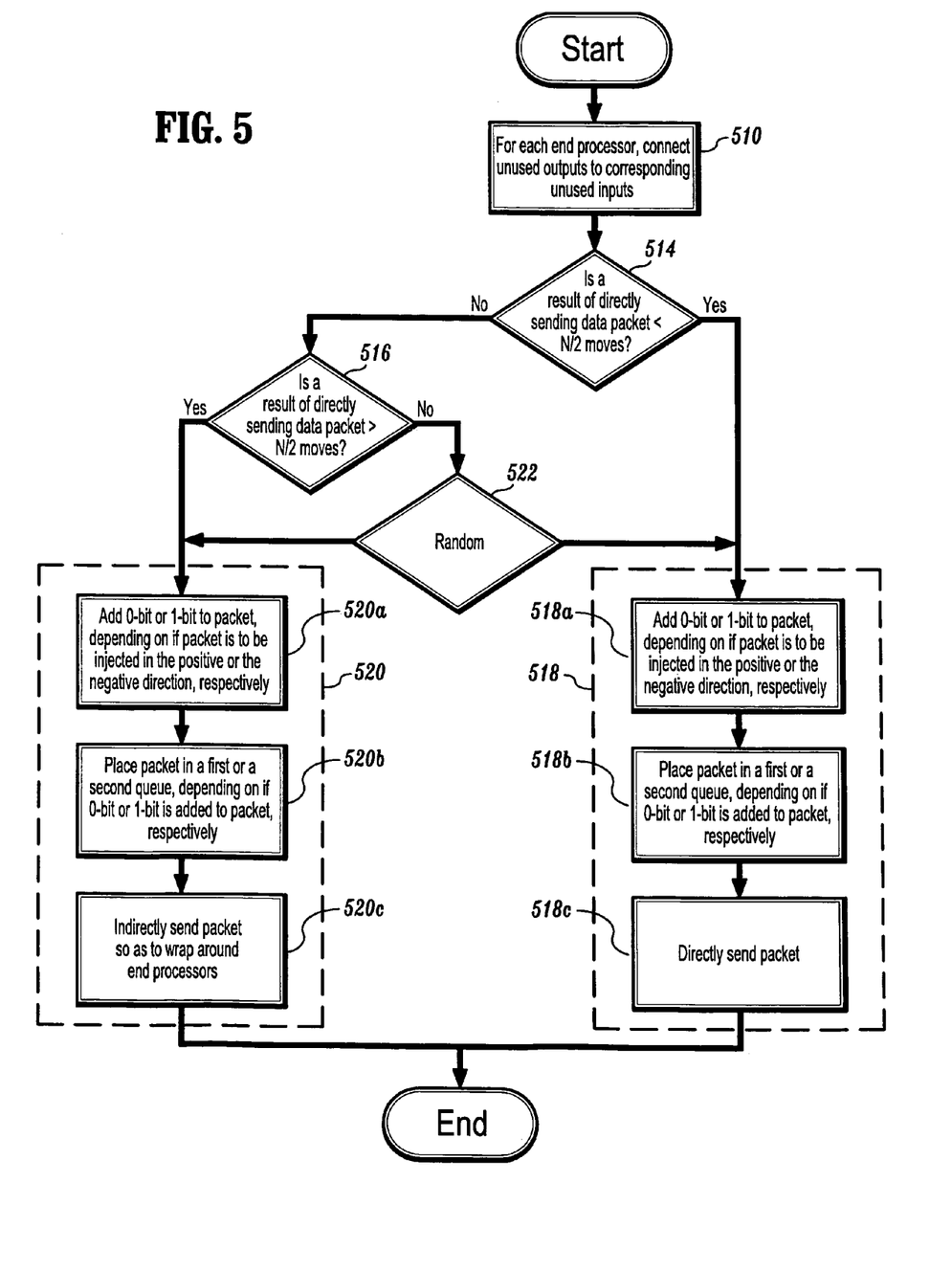
FIG. 5 is a flow diagram illustrating a method for routing packets on a linear array of N processors connected in a nearest neighbor configuration, according to an illustrative embodiment of the present invention.

A description of the "wrong" way routing scheme of the present invention will now be given with respect to FIGS. 4 and 5. FIG. 4 is a diagram illustrating the connection of a 2-dimensional array of processors according to an illustrative embodiment of the present invention. FIG. 5 is a flow diagram illustrating a method for routing packets on a linear array of N processors connected in a nearest neighbor configuration, according to an illustrative embodiment of the present invention. It is to be appreciated that while the method of FIG. 5 is being applied to the 2-dimensional processor array of FIG. 4, it is applicable to a processor array having any number of dimensions (1, 2, or 3).

The 2-dimensional array shown in FIG. 4 is an 8 by 6 array. That is, the array has 8 rows in the x direction and 6 columns in the y direction, for a total of 48 processors. The array includes the following end processors: a top, left end processor 410; a top, right end processor 420; a bottom, left end processor 430; and a bottom, right end processor 440.

For the purpose of illustration with respect to FIGS. 4 and 5, let us presume that the processors of the array are ordered in ascending order from left to right and from bottom to top (as in a typical x and y grid). Thus, the end processors are located as follows: the bottom, left end processor 430 is at location (1,1); the bottom, right end processor 440 is at location (6,1); the top, left end processor 410 is at location (1,8); and the top, right end processor 420 is at location (6,8). Moreover, let us presume that a packet is to be routed from a source processor 470 at location (2,2) to a destination processor 480 at location (5,7).

According to the method of FIG. 5, for each end processor of the array, unused outputs are connected to corresponding unused inputs (step 510). Thus, the left side output 412 of the top, left end processor 410 is connected to the left side input 414 of the top, left end processor 410. Moreover, the top side output 416 of the top, left end processor 410 is connected to the top side input 418 of the top, left end processor 410. The other end processors 420, 430, and 440 are connected in a similar manner as is readily apparent to one of ordinary skill in the related art.

For EACH axis required to directly route a packet from a source to a destination processor, the following steps are performed. It is to be appreciated that the order in which the axes are traversed may be predefined according to any convention (e.g., for a two-dimensional array such as that of FIG. 4, first x and then y are traversed, or vice versa), or such order may be randomly determined. For the purpose of illustration, a predefined order consisting of first x and then y is adopted.

At step 514, it is determined whether a result of directly sending a packet from an initial processor to a target processor is less than N/2 moves. If so, then the method proceeds to step 518. Otherwise, the method proceeds to step 516. It is to be noted that the value N (which corresponds to the number of processors in an axis under consideration) is equal to 6 for the x axis, and to 8 for the y axis.

At step 516, it is determined whether a result of directly sending the packet from the initial processor to the target processor is greater than N/2 moves. If so, then the method proceeds to step 520. Otherwise, the method proceeds to step 522.

At step 518 (result<N/2), the packet is directly sent from the initial processor to the target processor. At step 520 (result>N/2), the packet is indirectly sent from the initial processor to the target processor so as to wrap around each end processor. At step 522 (result=N/2, N is an even number), the method randomly returns to step 518 or step 520 to randomly send the packet either directly or indirectly, respectively. In steps 518 and 520, the packet is sent when a slot is available.

Each of steps 518 and 520 include the following substeps, which are performed prior to the sending of the packet: adding a 0-bit or a 1-bit to the packet (depending on whether the packet is to be injected into the corresponding axis in the positive or the negative direction, respectively) (steps 518*a*, 520*a*); and placing the packet in a first queue or a second queue (depending on whether the 0-bit or the 1-bit is added to the packet, respectively) (steps 518*b*, 520*b*). The sending portions of steps 518 and 520 described above are designated in FIG. 5 as 518*a* and 520*a*, respectively. One of ordinary skill in the related art will readily understand that the injection direction (and, thus, the value of the added bit) is dependent upon whether the packet is to be sent directly or indirectly.

Steps 514 through 522 will now be applied to the array of FIG. 4. For the x axis, which is to be considered first according to the convention adopted above, the initial processor (which is also the source processor 470) is at location (2,2), the target processor is at location (5,2), and N is equal to 6. Therefore, the result (of directly sending the packet from the initial processor to the target processor) for the x axis is exactly equal to N/2 moves (5 minus 2)). This situation corresponds to step 522 and, thus, the packet is to be randomly sent either directly or indirectly (by the method randomly returning to step 518 or step 520, respectively). For the purposes of illustration, a description of directly sending the packet from the initial processor to the target processor (i.e., step 518) in the x axis will be given. Prior to directly sending the packet, a 0-bit is added to the packet (since the packet is to be sent directly and, thus, is to be injected in the positive x direction), and the packet is placed in the first queue. As shown by the dotted line 490 in FIG. 4, the packet is then sent directly as follows: (2,2)->(3,2)->(4,2)->(5,2). It is to be noted that since the packet is being inserted into the positive x direction (by positive x direction logic), it can only be removed at the target processor when arriving in the same direction (positive x).

Next, for the y axis, the initial processor (previously the target processor for the x axis) is at location (5,2), the target processor (which is also the destination processor 480) is at location (5,7), and N is equal to 8. Thus, the result (of directly sending the packet from the initial processor to the target processor) for the y axis is greater than N/2 moves (7 minus 2). This situation corresponds to step 520 and, thus, the packet is to be indirectly sent (from the initial to the target processor)

so as to wrap around each end processor. Prior to indirectly sending the packet, a 1-bit is added to the packet (since the packet is to be sent indirectly and, thus, is to be injected in the negative y direction), and the packet is placed in the second queue. As shown by the dotted line 492 in FIG. 4, the packet is then sent indirectly as follows: (5,2)->(5,1)->wrap (bottom output 456 to bottom input 457, of bottom end processor 455)->(5,2)->(5,3)->(5,4)->(5,5)->(5,6)->(5,7)->(5,8)->wrap (right output 466 to right input 467, of processor 465)--(5,7). Note that the packet was ignored the first time it passed the target node. The target node receives the packet on the second pass of the packet.

It is to be appreciated there are two general ways in which a packet might be routed from one axis to another: by hardware or software. In either case, presume that the convention is adopted that a packet will travel first in the x-direction to its target column, and then in the y-direction to its destination processor, for a transmission spanning a 2-dimension array.

According to a hardware embodiment of the present invention, when a packet gets to its column, but it has some distance to travel in the vertical direction, the hardware transfers the packet to the vertical path, using wires (not shown). The packet would have both x and y coordinates of the target processor. The horizontal ruler would use the x coordinate for routing. When the packet gets to the column of the destination processor, the connection logic in the horizontal ruler would look at the y coordinate to see whether to read the packet in, or transfer it to the vertical path. The connection logic on the vertical path would use the y coordinate, and completely ignore the x coordinate.

According to a method of the present invention, the horizontal ruler would simply read in the packet when it gets to its destination column. The packet would have a y coordinate stored in it somewhere. The processor in the destination column would, if necessary, reformat the message by moving the y coordinate to the header area and then insert the packet in the vertical path.

While this method may go against intuition, simulation verifies that for random traffic it achieves both maximum bandwidth and uniform throughput for all nodes. For example, if 1000 packets are queued at each sender, then the resulting throughput is approximately 1 packet per sender per 2.3 cycles, and all senders finish their queues at a time within 5% of the average (showing that no sender is favored).

A description of some of the reasons for the success of the present invention will now be given. First, the direct method of routing on a ruler is unfair because nodes near the end are seldom, if ever, blocked. By routing some traffic the wrong way, we introduce blockage. The amount of new blockage increases as the position moves closer to the ends of the ruler. Second, while this additional traffic would at first glance appear to decrease overall performance, it in fact does not. In any ruler, the wires nearer to the ends would normally carry less traffic than the wires nearer to the middle. For example, in an eight node, 1-dimensional array, the wires going from node 1 to node 2 carry only packets originating from node 1, whereas the wires going from node 4 to node 5 carry some packets from each of nodes 1, 2, 3, and 4. The amount of traffic introduced by our wrong-way mechanism turns out to exactly equal the available excess capacity.

A description of how the present invention may be employed to reduce latency in the routing of packets on a ruler will now be given according to an illustrative embodiment thereof. In this embodiment, "real" messages are always sent in the direct path from sender to receiver. However, if the receiver is far away from the sender (i.e., if, according to the method of FIG. 5 above, the message would have been sent the "wrong" way), then the sender also sends a dummy message in the "wrong" direction. It sends the dummy message at the same time as the real message, traffic on the network permitting. When the dummy message gets back to the sender, that processor simply discards it. When the real message gets to the receiver, the receiver accepts it immediately and also, in the next cycle, sends a dummy message to itself in the same direction in which the real message was traveling. When the dummy message wraps around the end of the ruler and gets back to the receiver, the receiver discards it.

Thus the combination of the dummy and real messages use the same path segments as would be used in the original disclosure for messages that are sent the wrong way.

As an example, refer to FIG. 3 of the disclosure, which shows a row of eight processors. For processor 2 to send a message to processor 7, it would in the original disclosure be sent in the "wrong" way, i.e., along the path

2->1->2->3->4->5->6->7->8->8->7

This requires 11 hops and, thus, a latency of 11 cycles. In contrast, using dummy messages, the message flow would be as follows:

|  | Cycle | | | | | | | |
| --- | --- | --- | --- | --- | --- | --- | --- | --- |
|  | 1 | 2 | 3 | 4 | 5 | 6 | 7 | 8 |
| Real message | 2-3 | 3-4 | 4-5 | 5-6 | 6-7 |  |  |  |
| Dummy messages | 2-1 | 1-1 | 1-2 |  |  | 7-8 | 8-8 | 8-7 |

Thus, the message gets from processor 2 to processor 7 in just 5 hops, the minimum for this interconnection pattern. The dummy messages serve only to interfere with messages originating in processors near the end of the ruler, in a way that ensures fairness.

A description of the path logic of an array according to an illustrative embodiment of the present invention will now be given. Presume the messages being passed on the processor interconnection path have the following format:

| | |
| --- | --- |
| c[1]: | Create dummy flag |
| addr[3]: | Target (receiver) address |
| type[m]: | Message type (null, dummy, and other application-dependent types) |
| data[n]: | Message data bits |

The number of bits in the target address is, in general, $\text{ceil}(\log_2 P)$, where P is the number of processors on the ruler. The value of 3 shown corresponds to 8 processors.

Assume the type field is encoded with one value (e.g., zero) meaning "null", or no message present (i.e., an empty packet). Another value designates a "dummy" message. Other values are application dependent, e.g., for the Cyclops application some message types are "load", "store", and "interrupt processor". The "null" and "dummy" values could as well be represented by additional single-bit quantities. That design would use more wires on the path, but reduce the logic at each node.

The "c" bit is set to 1 by the processor if it is originating a message that would, in the design without dummies, go the "wrong" way. It is a signal to the receiver that, when it receives the message, it should create a dummy message with the same address but with c=0, and pass it on to the next node.

The message format might include other fields, such as a "from" (source) address.

Referring to FIG. 2, the logic at the ROUT (router) box for node p is as follows.

```
if type ≠ "null" then do
    if addr = p then do
        if type ≠ "dummy" then route the message to the processor (p)
            if c = 1 then create a dummy message (with c = 0) and pass it to the MUX
            else create a null message and pass it to the MUX.
    end
    else            /* addr ≠ p */
        pass the message (dummy or real) to the MUX
else                /* type = "null" */
    pass the "message" (an empty packet) to the MUX
```

The logic for the MUX stage is:

```
if type ≠ "null" then
    pass the message to REG (a latch)
else if processor (p) has a message to send then pass it to REG
    and notify processor that the message was accepted
else      /* type = "null" and processor has nothing to send */
    and pass the "message" (an empty packet) to REG
```

The logic for the REG stage is:

```
if a predetermined event is present on the Clock signal then
    pass data from MUX onto the bus for communication to the adjacent node
else wait (do nothing)
```

It is to be appreciated that the preceding description of the path logic of an array is merely for illustrative purposes and, thus, other path logic may be employed while maintaining the spirit and scope of the present invention. Given the teachings of the present invention provided herein, one of ordinary skill in the related art will be able to contemplate these and similar implementations of the elements of the invention.

A description of how the present invention may be employed to reduce power consumption in the routing of packets on a ruler will now be given according to an illustrative embodiment thereof. It is to be noted that the dummy messages carry no useful data. To reduce energy consumption, each processor could be provided with two latches, which would store the last message that passed the processor or that originated in the processor. One latch would be used for messages moving to the right, and the other latch would be used for messages moving to the left. A processor could then create a dummy message from the last message that was sent over the path segment about to be used. This reduces switching (voltage and current changes) in the path circuits, which is one of the primary sources of energy consumption in a processor array. The energy reduction would occur over the network segments that are used by both the earlier message and the dummy message.

Figure 6:
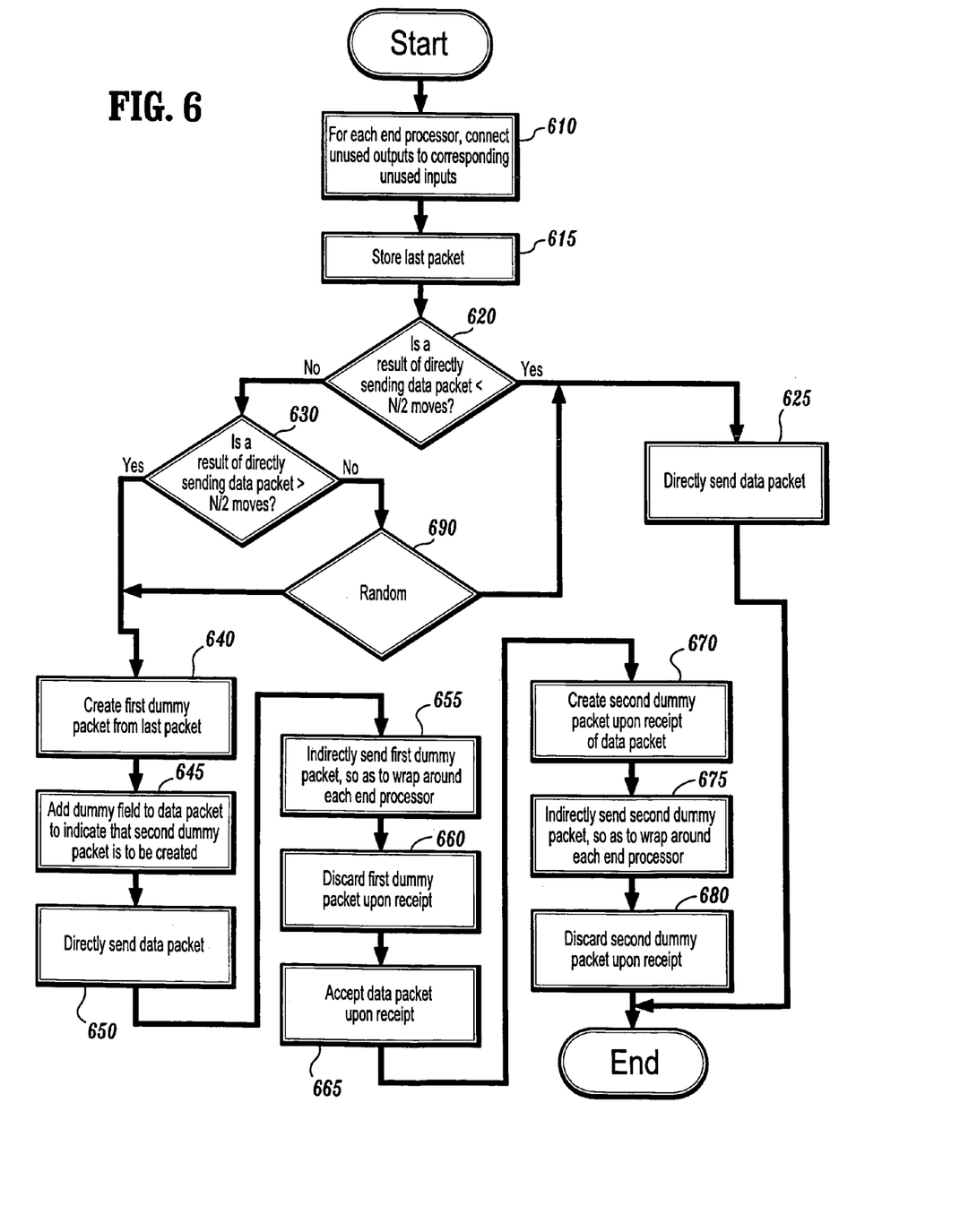
FIG. 6 is a flow diagram illustrating a method for routing packets on a linear array of N processors connected in a nearest neighbor configuration, according to another illustrative embodiment of the present invention.

FIG. 6 is a flow diagram illustrating a method for routing packets on a linear array of N processors connected in a nearest neighbor configuration, according to another illustrative embodiment of the present invention.

For each end processor of the array, unused outputs are connected to corresponding unused inputs (step 610). Each of the N processors stores (latches) the last packet that it passed through or that it originated (step 615).

For EACH axis required to directly route a packet from a source to a destination processor, the following steps are performed. It is to be appreciated that the order in which the axes are traversed may be predefined according to any, or such order may be randomly determined. For the purpose of illustration, a predefined order consisting of first x and then y is adopted.

At step 620, it is determined whether a result of directly sending a packet from an initial processor to a target processor is less than N/2 moves. If so, then the data packet is directly sent from the initial processor to the target processor (step 625), and the method is terminated. Otherwise, the method continues to step 630.

At step 630, it is determined whether a result of directly sending the packet from the initial processor to the target processor is greater than N/2 moves. If so, then the method proceeds to step 640. Otherwise, the method proceeds to step 690.

At step 640 (result<N/2), a first dummy packet is created by the initial processor from the last packet that was stored therein (as a result of step 615), and a dummy field is added to the data packet by the initial processor that indicates to the target processor that a second dummy packet is to be created by the target processor upon receipt of the data packet (step 645).

The data packet is directly sent from the initial processor to the target processor (step 650). The first dummy packet is indirectly sent, from and to the initial processor, in an initially opposing direction with respect to the target processor, so as to wrap around each end processor (step 655). The first dummy packet is discarded, upon the initial processor receiving the first dummy packet (step 660).

The data packet is accepted by the target processor (step 665), and the second dummy packet is created by the target processor from the last packet that was stored therein (as a result of step 615) (step 670), upon the target processor receiving the data packet. The second dummy packet is indirectly sent, from and to the target processor, in initially the same direction as the data packet so as to wrap around each end processor (step 675). The second dummy packet is discarded, upon the target processor receiving the second dummy packet (step 680), and the method is terminated.

The preceding steps may be considered to correspond to two situations. In both situations, the data packet is sent directly from the initial processor to the target processor. However, the two situations differ in that the method is then terminated if the result is less than N/2, and the two dummy messages are created and sent if the result is greater than N/2. Step 690 addresses the situation where the result is equal to N/2 and N is an even number.

At step 690, the method randomly returns to step 625 or step 640. Thus, in step 690, the packet is sent directly as in the above two situations. However, the creation and sending of the two dummy packets is performed randomly.

With respect to the method of FIG. 6, it is to be appreciated that either the first or the second dummy package may be omitted, with some compromise of fairness. That is, only one of the two dummy packets may be created and sent. Given the teachings of the invention provided herein, one of ordinary skill in the related art will be able to contemplate these and similar implementations or configurations of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for routing packets on a linear array of N processors connected in a nearest neighbor configuration, comprising the steps of:

for each end processor of the array, connecting unused outputs to corresponding unused inputs;

for each axis required to directly route a packet from a source processor to a destination processor, determining whether a result of directly sending a packet from an initial processor to a target processor is greater than N/2 moves, the initial processor being the source processor in a first axis, the target processor being the destination processor in a last axis;

directly sending the packet from the initial processor to the target processor, irrespective of the result; and indirectly sending at least one of a first dummy packet from and to the initial processor so as to wrap around each end processor, and a second dummy packet from and to the target processor so as to wrap around each end processor, when the result is greater than N/2 moves.

2. The method according to claim 1, wherein the first dummy packet is indirectly sent in an initially opposing direction with respect to the target processor.

3. The method according to claim 1, wherein the second dummy packet is indirectly sent in an initially same direction as the data packet.

4. The method according to claim 1, further comprising the step of discarding the first dummy packet, upon the initial processor receiving the first dummy packet.

5. The method according to claim 1, wherein said step of indirectly sending the second dummy packet is performed upon the target processor receiving the data packet.

6. The method according to claim 1, further comprising the step of discarding the second dummy packet, upon the target processor receiving the second dummy packet.

7. The method according to claim 1, wherein the first dummy packet is sent at substantially a same time as the data packet.

8. The method according to claim 1, wherein the first dummy packet is sent when a transmission slot is available for the initial processor.

9. The method according to claim 1, further comprising the step of adding a dummy field to a given data packet that indicates to a corresponding target processor that a given dummy packet is to be created upon receipt of the given data packet, when a result of directly sending the given data packet from a corresponding initial processor to the corresponding target processor is greater than N/2 moves.

10. The method according to claim 1, further comprising the step of adding a dummy field to the data packet that indicates to the target processor that the second dummy packet is to be created upon receipt of the data packet, when the result is greater than N/2 moves.

11. The method according to claim 1, further comprising the steps of:

storing a last packet that one of passed through the initial processor or originated from the initial processor; and creating the first dummy packet from the last packet to reduce energy consumption resulting from at least one of voltage and current switching.

12. The method according to claim 1, further comprising the steps of:

storing a last packet that one of passed through the target processor or originated from the target processor; and creating the second dummy packet from the last packet to reduce energy consumption resulting from at least one of voltage and current switching.

* * * * *